United States Patent [19]

Elmore

[11] 4,044,789
[45] Aug. 30, 1977

[54] SANITARY DIVERSION VALVE

[76] Inventor: John E. Elmore, P.O. Box 474, Oak Hill, W. Va. 25901

[21] Appl. No.: 758,640

[22] Filed: Jan. 12, 1977

[51] Int. Cl.² .............................................. F16K 11/07
[52] U.S. Cl. .................................... 137/367; 137/371; 137/625.47; 137/798; 251/148; 251/287; 285/21; 285/DIG. 16
[58] Field of Search .............. 137/364, 367, 368, 369, 137/370, 371, 625.47, 798; 251/148, 287, 309; 285/21, 173, DIG. 16

[56] References Cited
U.S. PATENT DOCUMENTS

| 1,486,707 | 3/1924 | Warner | 137/371 |
|---|---|---|---|
| 1,759,221 | 5/1930 | Carson | 137/364 |
| 3,038,695 | 6/1962 | Wildern | 251/287 X |
| 3,111,299 | 11/1963 | Miller et al. | 251/309 X |
| 3,168,280 | 2/1965 | Mueller | 251/286 X |
| 3,228,654 | 1/1966 | Olliff | 251/309 |
| 3,233,865 | 2/1966 | Panzica et al. | 251/309 |
| 3,746,034 | 7/1973 | Cosson | 137/364 |

OTHER PUBLICATIONS

Fraklin Research Bulletin, "Effluent Diversion Valve", 1 page.

Primary Examiner—Alan Cohan
Assistant Examiner—Gerald A. Michalsky
Attorney, Agent, or Firm—Stanley M. Miller

[57] ABSTRACT

An improved sanitary diversion valve is disclosed which provides a better seal to plastic sanitary pipe, is corrosion resistant, has an improved valve core retention mechanism, and a sealed access to prevent leakage and tampering. A resilient O-ring core retention mechanism maintains the core in close contact with the housing without being susceptible to corrosion. Plastic coupling rings are molded into the inlet and outlet ports of the housing to enable high integrity seals to be formed with plastic sanitary pipe connecting therewith. In addition, a plastic coupling ring is molded around the core shaft port in the housing to enable sealing a plastic sanitary pipe thereto as an access tube to the valve. The resulting improved sanitary diversion valve is easily fabricated, easy to install, provides a high integrity seal with plastic sanitary pipe connecting thereto, is reliable for withstanding corrosion of its moving parts during a long term of operation, and is leakage and tamper proof.

15 Claims, 6 Drawing Figures

SEC B-B'

SEC A-A'

SANITARY DIVERSION VALVE

FIELD OF THE INVENTION

The invention disclosed broadly relates to plumbing fittings and more particularly relates to sanitary diversion valves suitable for connection to plastic sanitary pipe.

BACKGROUND OF THE INVENTION

The predominant type of domestic, private sewage disposal system is the septic tank and drainage field. Waste from the house flows into a water tight septic tank. There it remains approximately 24 hours while bacteria reduce many of the solids to a liquid state. At the end of this interval, the liquids flow out of the tank into a leaching field through a network of porous pipes. These porous pipes are placed fairly close to the ground surface, which allows air to get to the liquids and evaporate them before they have a chance to drain off into the ground water.

In many localities, the porosity of the ground is not sufficiently high to permit the sustained operation of a septic leaching field and it has been found that, in such areas, the use of two, separate leaching fields used alternately, will enable the ground in a first field to dry out while the second field is in use.

Prior to the advent of plastic sanitary pipe, sanitary leaching fields were connected to the septic tank by means of clay soil pipe. In those localities which required the use of two alternate leaching fields, a sanitary diversion valve was employed to selectively connect the first or the second leaching field to the septic tank. The prior art sanitary diversion valves were made of metal parts which tended to be unreliable due to their tendency to corrode under long term use. The clay soil pipe was sealed to the prior art sanitary diversion valve by packing oakum into the joint, followed by a coating of cement mortar.

In the early 1970's, two types of plastic pipe came into common use by the construction industry for sanitary pipe. The first is a tough, rigid thermoplastic, acroylonitrile-butadiene-styrene, known as ABS resin. ABS resins used in plastic sanitary pipe, are true graft polymers consisting of an elastomeric polybutadiene or rubber phase, grafted with styrene and acrylonitrile monomers for compatability, dispersed in a rigid styrene-acrylonitrile matrix. ABS plastic sanitary pipe has a high impact resistance, a high mechanical strength, and resistance to creep under load. This desirable combination of properties is retained over a temperature range of minus 40° to 140° Fahrenheit with little change. ABS resins exhibit resistance to chemical attack by water, aqueous salt solutions, alkalies, nonoxidizing inorganic acids, many food stuffs and household cleaners and oils. ABS plastic sanitary pipes may be joined by means of solvent welding using a solvent such as butanone. The other type of plastic which has come into wide use in the construction industry for sanitary pipe is polyvinyl chloride, otherwise known as PVC. PVC resins can be formed as rigid structural materials which have a high resistance to chemicals, solvents and water. PVC plastic sanitary pipe has a good resistance to weathering, is low in cost and has a good abrasion and impact resistance.

In adapting ABS and PVC plastic sanitary pipe to septic tank disposal systems employing two alternate leaching fields, problems have been experienced in securely joining the plastic sanitary pipe to the sanitary diversion valve so that a reliable, leakproof seal can be made therewith. The prior art techniques of employing oakum and cement mortar result in an unreliable seal. Still another problem which has been associated with prior art sanitary diversion valves, is that the valve core tends to leak through the housing at the point at which access is made and further that dirt and other debris from the ambient become lodged at the valve handle. The valve handle is also susceptible to tampering by unauthorized persons.

OBJECTS OF THE INVENTION

It is therefore an object of the invention to provide an improved sanitary diversion valve.

It is another object of the invention to provide an improved sanitary diversion valve which is not susceptible to corrosion.

It is still another object of the invention to provide a sanitary diversion valve which can be reliably sealed to plastic sanitary pipe.

It is still another object of the invention to provide a sanitary diversion valve which has a valve access-way which is sealed to prevent leakage, fouling, and tampering.

SUMMARY OF THE INVENTION

These and other objects, features and advantages are provided by the improved sanitary diversion valve disclosed herein. The valve comprises a molded housing having plastic coupling rings of either ABS or PVC plastic molded into the inlet and outlet ports thereof to enable the formation of a reliable seal with plastic sanitary pipe. The valve further provides for sealing the access-way to the valve handle to prevent leakage, fouling and tampering, by molding into the housing a plastic coupling ring which may be joined with another plastic pipe to form the sealed access-way. All moving parts for the valve are made of non-corroding materials and, in particular, the core retention mechanism to maintain the core in tight mating engagement with the housing, is a resilient O-ring positioned in a circular depression at the bottom of the core. In this manner, no metallic components are required and therefore no corrosion and consequent fouling will occur. The resulting sanitary diversion valve forms a more reliable seal with plastic sanitary pipe, is more resistant to corrosion and fouling of its moving parts, and is more resistant to leakage and fouling at its valve actuating handle than are prior art sanitary diversion valves.

DESCRIPTION OF THE FIGURES

These and other objects, features and advantages of the invention may be more fully appreciated with reference to the accompanying drawings.

DISCUSSION OF THE PREFERRED EMBODIMENT

Figure 1:
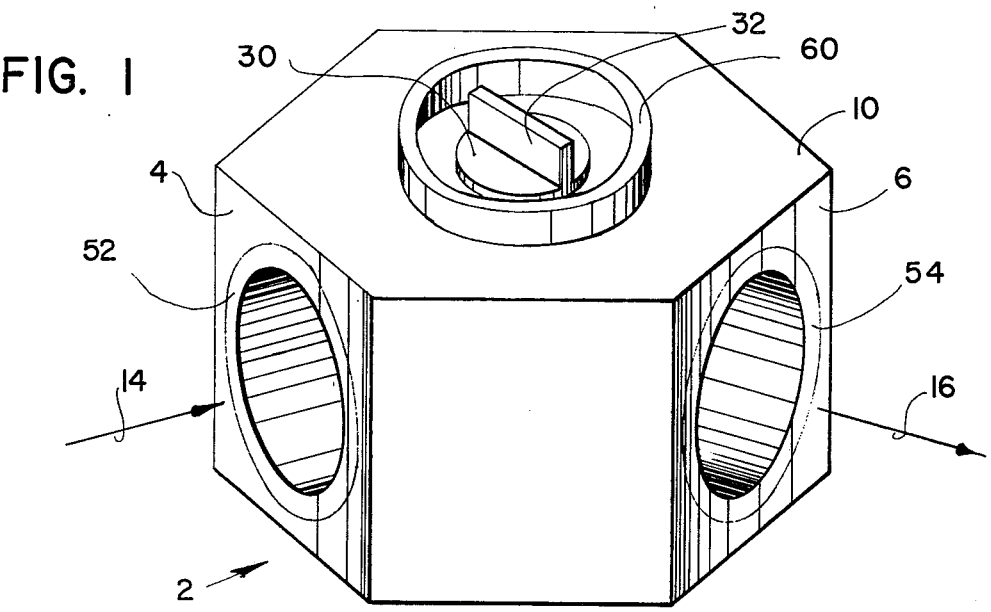
FIG. 1 is an overall, isometric view of the improved sanitary diversion valve.

An overall view of the improved sanitary diversion valve is shown in FIG. 1 where the molded housing 2 has three sides 4, 6, and 8, a top surface 10 and a bottom surface 12. An inlet port 14 and a first side surface 4 will be connected via plastic sanitary pipe to the septic tank. A first outlet port 16 and a second outlet port 18 and a second side 6 and a third side 8 of the housing 2, will be respectively connected to a first and second leaching fields by means of sanitary plastic pipe. The actuating handle 32 for the valve core 28 is shown protruding through a top surface 10 of the housing 2.

Figure 2:
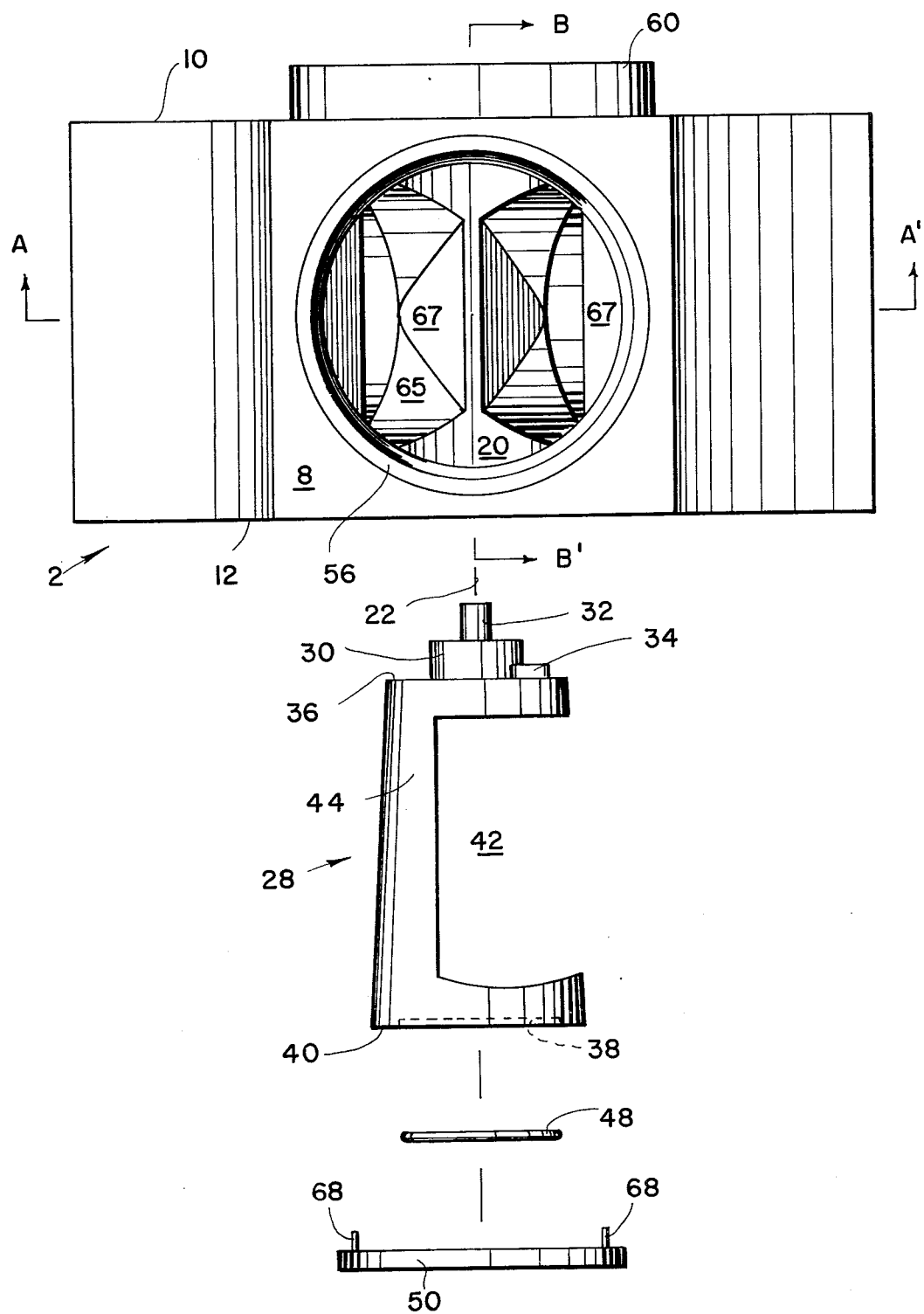
FIG. 2 is an exploded view of the sanitary diversion valve showing the interrelationship of its various parts.
Figure 3A:
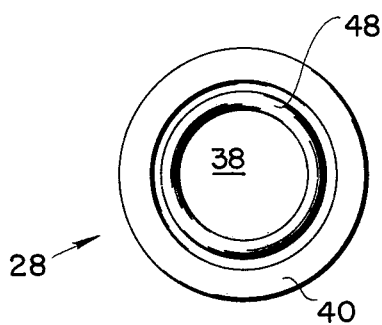
FIG. 3a is a bottom view of the valve core.
Figure 3B:
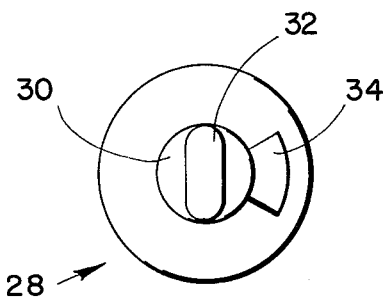
FIG. 3b is a top view of the valve core.

FIG. 2 shows an exploded view of the improved sanitary diversion valve, illustrating the interrelationship of its principal parts; the housing 2, the valve core 28, the O-ring 48, and the bottom plate 50. As is seen in FIG. 2, the valve core 28 is shaped as the frustum of a cone having a surface 44 with an angle of approximately 2.5° with respect to the axis 22 of the cone. The valve core 28 has a shaft 30 extending from its narrower top end 36. Circular depression 38 is engraved in the larger bottom end 40 of the valve core 28, coaxial with the conical axis 22. The resilient O-ring 48 will be positioned in this circular depression 38, in the assembly, as seen to better advantage in FIG. 3a. FIG. 3b illustrates the relative position of the shaft 30 and valve handle 32 on the top surface 36 of the valve core 28.

Figure 4:
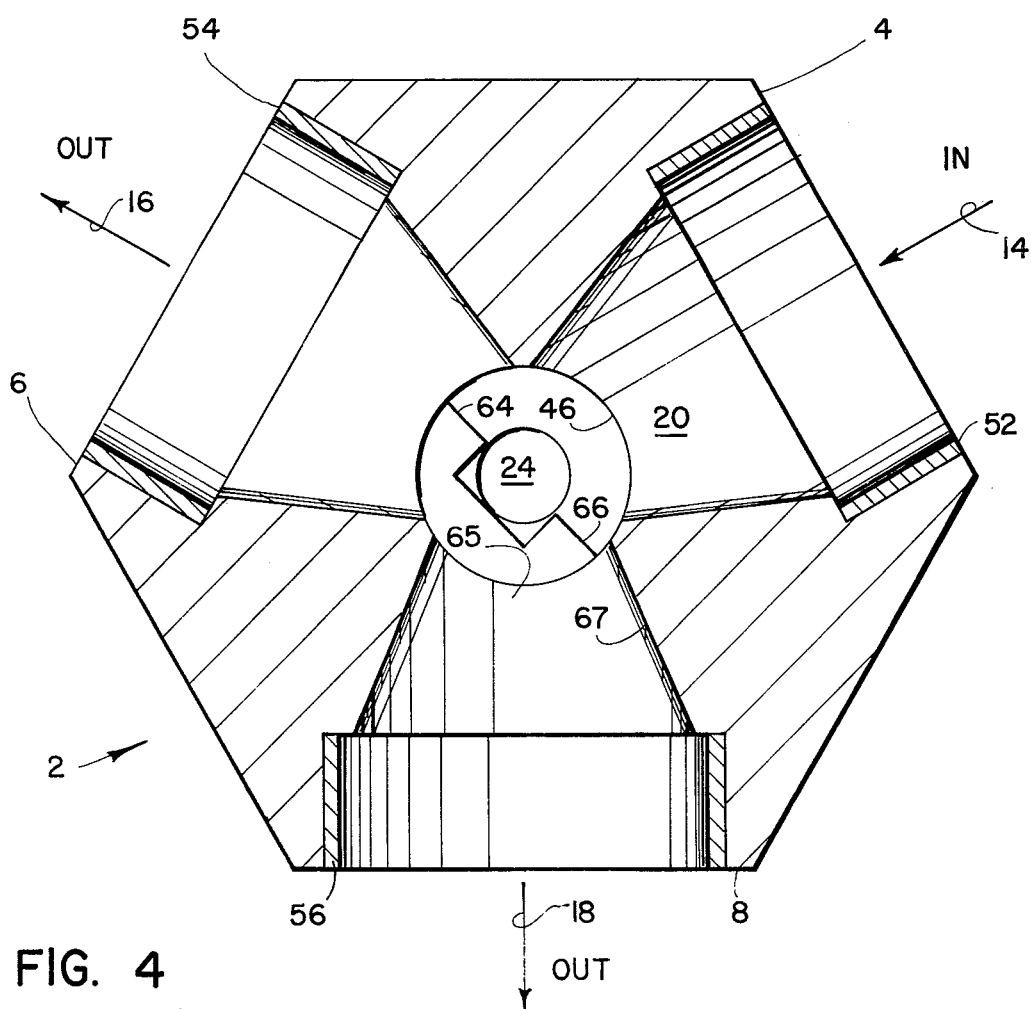
FIG. 4 is a cross sectional diagram along the section A-A' of FIG. 2, of the improved sanitary diversion valve.

The housing 2 has a core receiving cavity 20 shown in FIG. 4, which opens onto the top surface 10 of the housing 2 through a core shaft port 24, opens onto the bottom surface 12 of the housing 2 through a core insertion port 26, and communicates with the inlet port 14 and the first and second outlet ports 16 and 18. As is seen in the cross sectional view of FIG. 5, the core receiving cavity 20 has a general internal surface of the frustum of a cone which generally matches the conical surface 44 of the valve core 28.

The valve core 28, when assembled with the housing 2, is inserted with its shaft 30 first, through the core insertion port 28 so that the shaft 30 will extend through the shaft port 24 on the top side 10 of the housing 2. As is seen in FIG. 2, the valve core 28 has a trough 42 formed in the conical side 44 thereof, transverse to the conical axis 22. When the valve core 28 is assembled within the core receiving cavity 20 of the housing 2, with its shaft 30 protruding through the core shaft port 24, the conical side 44 of the valve core meets with the inner conical surface 46 of the housing cavity 20. By axially rotating the core 28 within the cavity 30, about the axis 22, the trough 42 in the valve core 28 will be selectively aligned with either the first outlet port 16 or the second outlet port 18, allowing exclusive communication between the inlet port 14 and the respective outlet port. In this manner, the inlet port 14 may be selectively connected with either the first outlet port 16 or the second outlet port 18 so as to connect the septic tank with either the first or the second leaching field in the septic system.

As is shown in FIG. 2, the bottom plate 50 is mounted by means of screws 68 to the bottom surface 12 of the housing 2, over the core insertion port 26. In the assembly, the bottom plate 50 presses upwardly against the O-ring 48, to force the conical surface 44 of the valve core 28 into tight engagement with the conical surface 46 of the cavity 20 for the housing 2.

The O-ring may be an acid resisting rubber such as neoprene. The use of the resilient O-ring as the retention mechanism for the valve core in the housing, removes a harmful source of corrosion for the moving parts of the sanitary diversion valve which, in prior art systems, resulted in the fouling of the moving parts after long use.

A high integrity seal is provided between the improved sanitary diversion valve and sanitary plastic pipe by molding into the inlet port 14 a first plastic coupling ring 52 composed of ABS resin for sealing the inlet port 14 to a first plastic sanitary pipe 58 also composed of ABS resin. Alternately, the first plastic coupling ring 52 may be composed of PVC, for sealing the inlet port 14 to a first plastic sanitary pipe 58 composed also of PVC. In like manner, a second plastic coupling ring 54 is molded into the first outlet port 16 for sealing the first outlet port to a second plastic sanitary pipe and a third plastic coupling ring 56 is molded into the second outlet port 18 for sealing the second outlet port to a third plastic sanitary pipe. The first plastic sanitary pipe serves as the source of effluent, and the second and third plastic sanitary pipes serve as first and second destinations for the effluent. When the plastic coupling rings 52, 54, and 56 and the plastic sanitary pipes 58 are composed of ABS resin, they may be solvent welded together with butanone welding solvent. This forms a high integrity, leakproof seal having a long lifetime under heavy use.

Figure 5:
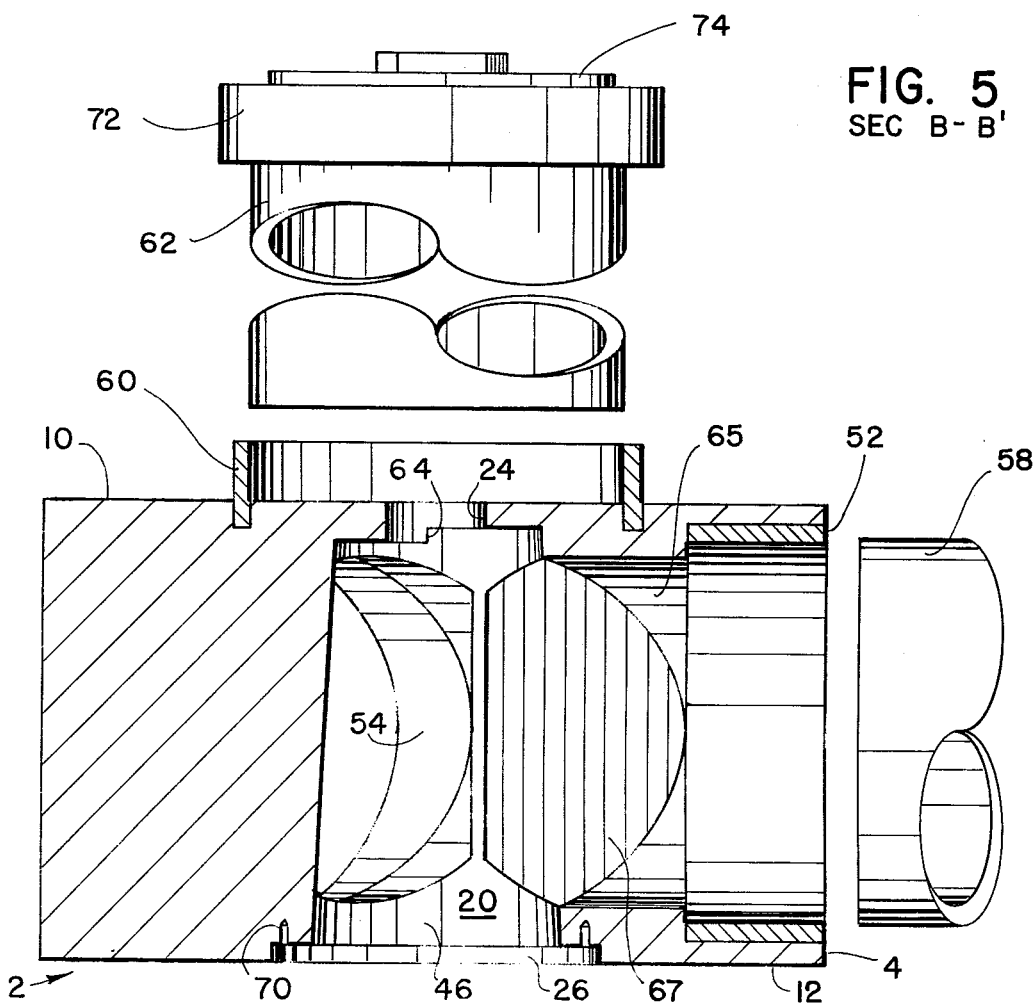
FIG. 5 is a cross sectional view along the section B-B' of FIG. 2, of the improved sanitary diversion valve.

A fourth plastic coupling ring 60, as shown in FIG. 5, is molded into the top surface 10 of the housing 2 and coaxial with the core shaft port 24, for sealing a fourth plastic sanitary pipe 62 to the top surface of the housing 2, to provide a sealed access tube for the handle 32 of the core shaft 30. This fourth plastic coupling ring 60 and fourth plastic sanitary pipe 62 may be composed of ABS resin and may be solvent welded at their joint by butanone welding solvent. Alternately, the plastic coupling ring 60 and the plastic sanitary pipe 62 may be composed of PVC. As shown in FIG. 5, the plastic clean-out bushing 72 may be sealed to the top of the fourth plastic sanitary pipe 62, at the end opposite the housing 2. The inner surface of the clean-out bushing 72 has a threaded surface which mates with the threaded plug 74. In this manner, the core shaft port 24 in the housing 2 can be sealed to prevent leakage of ground water therein, by means of the sealed access way formed by the pipe 62, the clean-out bushing 72 and the threaded plug 74. In addition, debris from the surrounding ground is prevented from falling into the core shaft port 24, thereby fouling the operation thereof. Furthermore, unauthorized operation of the valve core by children or others, is prevented.

The housing 2 for the improved sanitary diversion valve must be capable of being molded about the plastic coupling rings 52, 54, 56 and 60, must be tough and rigid, must be dimensionally stable, and chemically resistant. A suitable material for the housing 2 is urethane rubber, formed from liquid elastomers resin which is capable of being cast in a simple pour and cure technique using a low cost mold. The resin may be homo-polymerized with a tertiary amine or Lewis acid or copolymerized with primary and secondary aliphatic amines. The reaction with primary and secondary amines is exothermic and the cure may be carried out at room temperature. The resulting casting has a low shrinkage and an absence of volitile reactants. The cured urethane rubber has a lap shear adhesive strength which may exceed 10,000 psi, and forms a good bond to the plastic coupling rings 52, 54, 56, and 60.

The valve core 28 and the bottom plate 50 may also be formed from cast urethane resin, as was described for the housing 2.

As shown in FIG. 3b, the shaft 30 of the valve core 28 has a dog projection 34 which engages two limit stops 64 and 66 on the housing 2, as shown in FIG. 4. This facilitates the alignment of the trough 42 in the valve core 28 with either of the two outlet ports 16 or 18 in the housing 2. The resulting improved sanitary diversion valve has higher integrity seals with plastic sanitary pipes, has a more reliable operation for a longer term of life, is easier to fabricate, easier to install, and easier to adjust and maintain than were the prior art sanitary diversion valves.

Although the invention has been described in its preferred embodiment with a degree of specificity, it will be understood by those skilled in the art that changes and substitutions may be made in materials and shapes of the various components of the invention, without departing from the spirit and scope of the invention.

I claim:

1. An improved sanitary diversion valve, for connection to plastic sanitary pipe, comprising:

a molded housing having three side surfaces, a top and a bottom surface, with an inlet port in a first one of said side surfaces and first and second outlet ports in second and third ones of said side surfaces, with a frusto-conical core receiving cavity having an axis substantially perpendicular to said top surface and opening onto said top surface through a core shaft port and opening onto said bottom surface through a core insertion port, said cavity communicating with said inlet and said first and second outlet ports;

a frusto-conical valve core having a shaft extending from its narrower top end, a circular depression engraved in its larger bottom and coaxial with the conical axis, and a trough in the conical side thereof, transverse to said conical axis, said valve core inserted through said core insertion port of said housing with said shaft extending through said shaft port of said housing and said conical side of said valve core mating with the inner conical surface of said housing cavity, for selectively connecting said inlet port with either said first or said second outlet port by axially rotating said core within said cavity, to align said trough with said first or second outlet port;

a resilient O-ring positioned in said circular depression of said bottom end of said core;

a bottom plate mounted to said bottom surface of said housing over said core insertion pipe, for pressing upwardly against said O-ring, to resiliently seat said conical surface of said core with the mating inner conical surface of said cavity in said housing.

2. The improved sanitary diversion valve of claim 2, which further comprises:

a first plastic coupling ring molded into said inlet port, for sealing said inlet port to a first plastic sanitary pipe, serving as a source of effluent;

a second plastic coupling ring molded into said first outlet port for sealing said first outlet port to a second plastic sanitary pipe, serving as a first destination for the effluent;

a third plastic coupling ring molded into said second outlet port for sealing said second outlet port to a third plastic sanitary pipe, serving as a second destination for the effluent.

3. The improved sanitary diversion valve of claim 2, wherein:

said first, second and third plastic coupling rings and said plastic sanitary pipes are composed of acrylonitrile-butadiene-styrene resin.

4. The improved sanitary diversion valve of claim 3, which further comprises:

a fourth plastic coupling ring molded into said top surface of said housing and coaxial with said core shaft port, for sealing to a fourth plastic sanitary pipe serving as an access tube to said core shaft.

5. The improved sanitary diversion valve of claim 4, wherein said fourth plastic coupling ring and said fourth plastic sanitary pipe are composed of acrylonitrile-butadiene-styrene resin.

6. The improved sanitary diversion valve of claim 5, wherein said plastic coupling rings and said plastic sanitary pipes are respectively solvent welded together with butanone welding solvent.

7. The improved sanitary diversion valve of claim 5, wherein said molded housing is composed of cast urethane rubber.

8. The improved sanitary diversion valve of claim 2, wherein:

said first, second and third plastic coupling rings are composed of acrylonitrile-butadiene-styrene resin.

9. The improved sanitary diversion valve of claim 8, which further comprises:

a fourth plastic coupling ring molded into the said top surface of said housing and coaxial with said core shaft port, for sealing to a fourth plastic sanitary pipe serving as an access tube to said core shaft.

10. The improved sanitary diversion valve of claim 9, wherein said fourth plastic coupling ring is composed of polyvinyl chloride.

11. The improved sanitary diversion valve of claim 9, which further comprises:

a clean-out bushing connected to said fourth plastic sanitary pipe at the end opposite to said housing, having a threaded surface;

a threaded plug mating with said threaded surface of said clean-out bushing;

whereby said core shaft in said housing can be sealed to prevent leakage and unauthorized operation of said valve core.

12. The improved sanitary diversion valve of claim 2, wherein:

said first, second and third coupling rings are composed of polyvinyl chloride.

13. The improved sanitary diversion valve of claim 1, wherein said O-ring is composed of an acid resisting rubber.

14. The improved sanitary diversion valve of claim 1, wherein said valve core is composed of cast urethane rubber.

15. The improved sanitary diversion valve of claim 1, wherein said shaft of said valve core has a dog projection which engages two limit stops on said housing, for aligning said trough in said valve core with either of said two outlet ports in said housing.

* * * * *